United States Patent [19]
Thomas et al.

[11] Patent Number: 5,704,254
[45] Date of Patent: Jan. 6, 1998

[54] STEERING COLUMN ISOLATOR PADS

[75] Inventors: David E. Thomas; Thomas S. Kaliszewski, both of Rochester Hills; Rodney L. Eaton, Clarkston; Thomas Dziegielewski, Rochester Hills, all of Mich.

[73] Assignee: Chrysler Corporation, Auburn Hills, Mich.

[21] Appl. No.: 181,939

[22] Filed: Feb. 13, 1995

[51] Int. Cl.⁶ .................................... B62D 1/16
[52] U.S. Cl. .................. 74/492; 403/220; 411/509
[58] Field of Search ............... 403/200; 411/508, 411/509, 510, 460, 913; 74/492; 280/777, 779

[56] References Cited

U.S. PATENT DOCUMENTS

| | | |
|---|---|---|
| 3,302,478 | 2/1967 | Pauwels .................... 74/493 |
| 3,468,182 | 9/1969 | Shwartzberg ............. 74/492 |
| 3,621,732 | 11/1971 | Kaniut ..................... 74/492 |
| 3,707,096 | 12/1972 | Bennett ................... 74/492 |
| 3,805,636 | 4/1974 | Howes ..................... 74/492 |
| 3,902,215 | 9/1975 | Waldrop et al. ........... 411/509 |
| 4,884,778 | 12/1989 | Yamamoto ............... 248/548 |
| 5,110,233 | 5/1992 | Hoblingre et al. ......... 403/12 |
| 5,181,435 | 1/1993 | Khalifa .................... 74/492 |
| 5,507,610 | 4/1996 | Benedetti et al. ......... 411/509 |

Primary Examiner—Charles A. Marmor
Assistant Examiner—David M. Fenstermacher
Attorney, Agent, or Firm—Lawrence J. Shurupoff

[57] ABSTRACT

A steering column support having a bracket on the steering column secured to vehicle support structure by fasteners at the rear edge of the bracket. Isolator pads at the front edge of the bracket are clamped under pressure between the bracket and the support structure. The isolator pads dampen vibration of the steering column and also prevent undesirable tilting or rocking of the steering column when the vehicle is in motion.

2 Claims, 2 Drawing Sheets

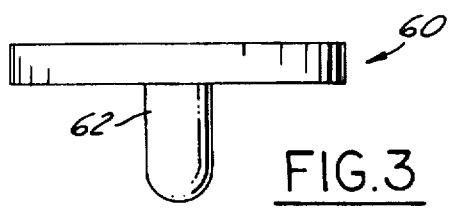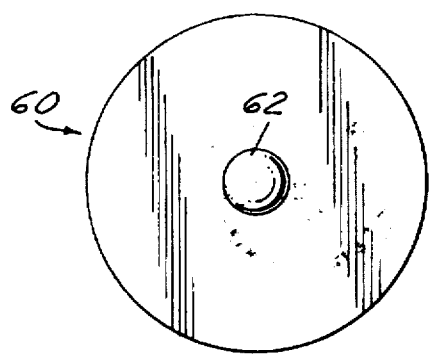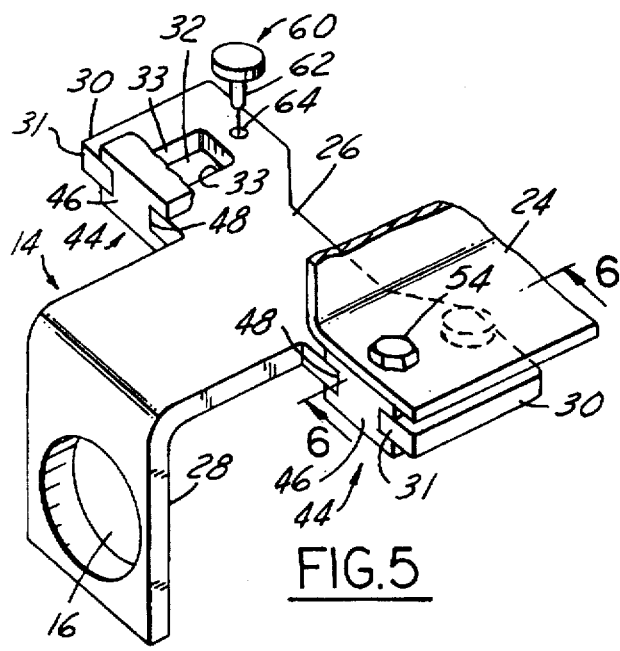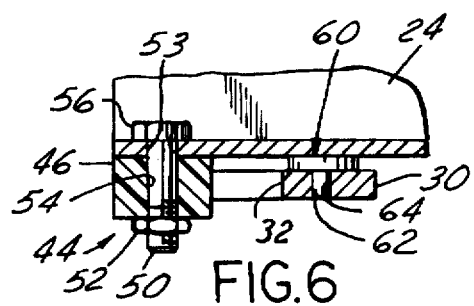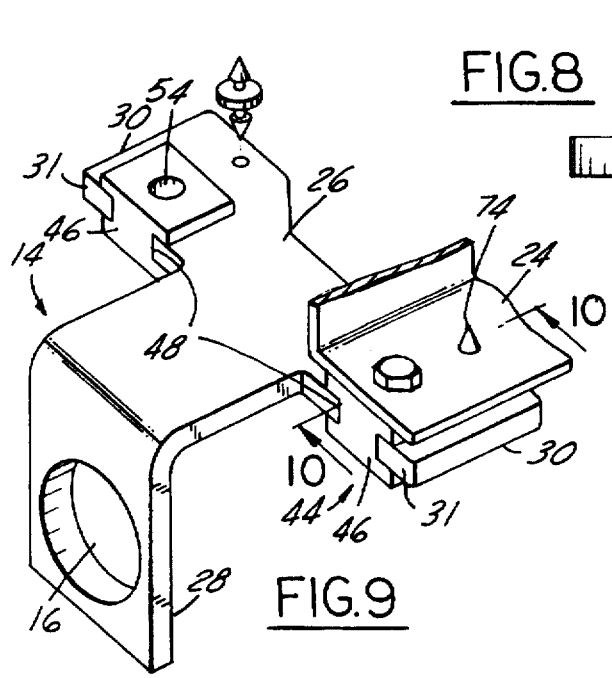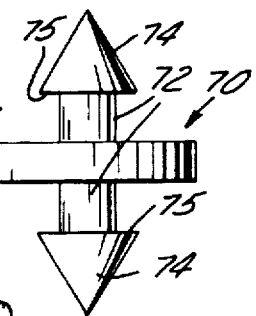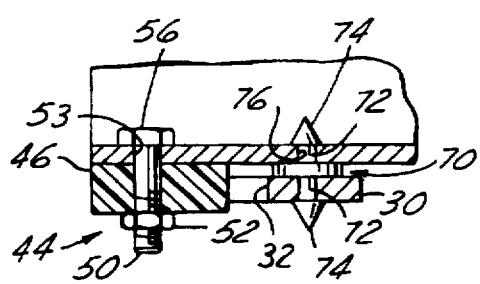

5,704,254

STEERING COLUMN ISOLATOR PADS

FIELD OF THE INVENTION

This invention relates to a steering column support assembly for an automobile, with isolator pads for dampening vibration and preventing undesirable rocking or tilting of the steering column when the automobile is in motion.

BACKGROUND AND SUMMARY

In a steering column support assembly, such as shown in U.S. Pat. No. 5,181,435, spacers are provided to connect the steering column to vehicle support structure and to reduce the effect of vibrations on the steering column during operation of the vehicle. The effectiveness of the spacers in reducing vibration can be significantly increased by the isolator pads of this invention which not only further reduce if not entirely eliminate vibration but also prevent undesirable tilting or rocking of the steering column when the vehicle is in motion. The pads may be tuned, based on steering column requirements, by changing the durometer of the material.

Further in accordance with this invention, the isolator pads are preferably made of a resinous plastic material, suitable for vibration dampening, and are clamped under pressure between a mounting bracket on the steering column and the vehicle support structure. The isolator pads may be connected to the steering column mounting bracket or to the vehicle support structure, or both. Preferably, the isolator pads are connected to both, with a "Christmas tree" or push-type connection which is easy to install but difficult to withdraw. When the isolator pads are thus connected to both the steering column mounting bracket and the vehicle support structure, they effectively dampen vibration in both directions.

An object of this invention is to provide a steering column support assembly with isolator pads having the foregoing features.

Another object is to provide a steering column support assembly composed of a relatively few simple parts, which is rugged and durable in use, and which is easy and inexpensive to manufacture and assemble.

Other objects, features and advantages of the invention will become more apparent as the following description proceeds, especially when considered with the accompanying drawings.

BRIEF DESCRIPTION OF THE DRAWINGS

FIG. 3 is a side elevational view of an isolator pad.

FIG. 4 is an end view of the isolator pad shown in FIG. 3.

FIG. 5 is a perspective view of the steering column mounting bracket with parts broken away, showing one of the isolator pads separated from the bracket and also showing the spacers which engage the mounting bracket and form portions of the fastener assemblies by which the mounting bracket is attached to the vehicle support structure.

FIG. 6 is a sectional view taken on the line 6—6 in FIG. 5.

FIG. 7 is a side elevational view of an isolator pad of modified construction.

FIG. 8 is an end view of the isolator pad shown in FIG. 7.

FIG. 9 is a view similar to FIG. 5, but showing the modified isolator pad associated therewith.

FIG. 10 is a sectional view taken on the line 10—10 in FIG. 9.

DETAILED DESCRIPTION

Figure 1:
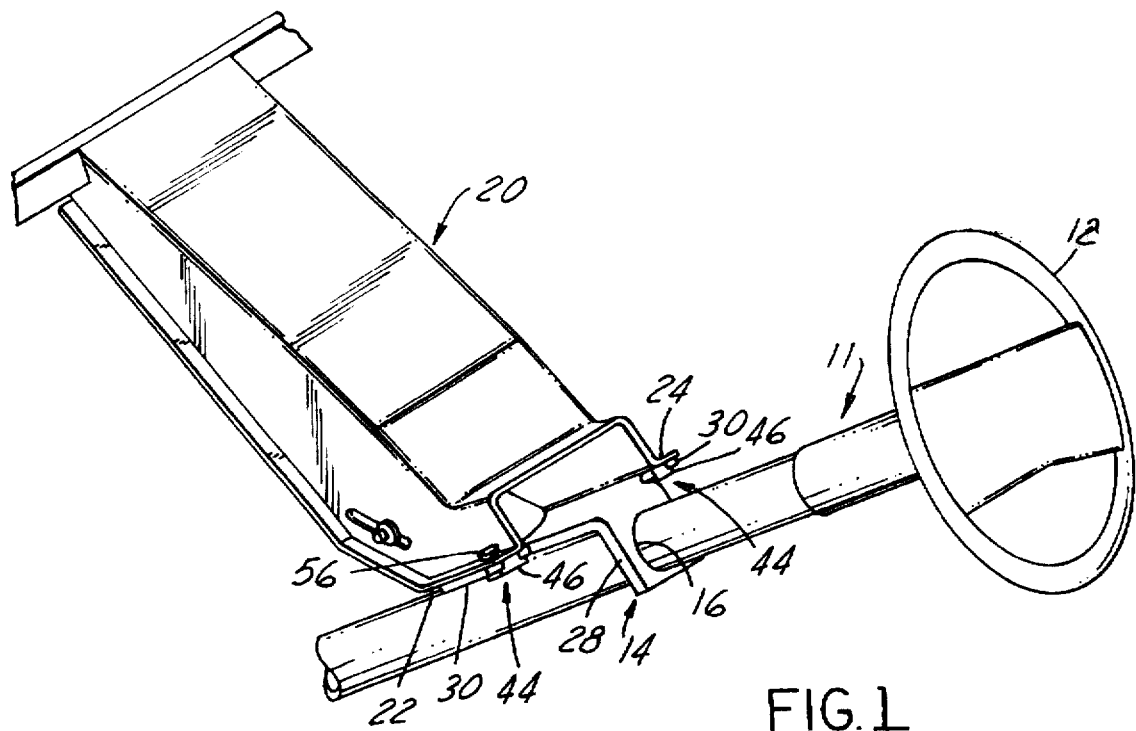
FIG. 1 is a perspective view of a support for the steering column of an automobile, constructed in accordance with the invention.
Figure 2:
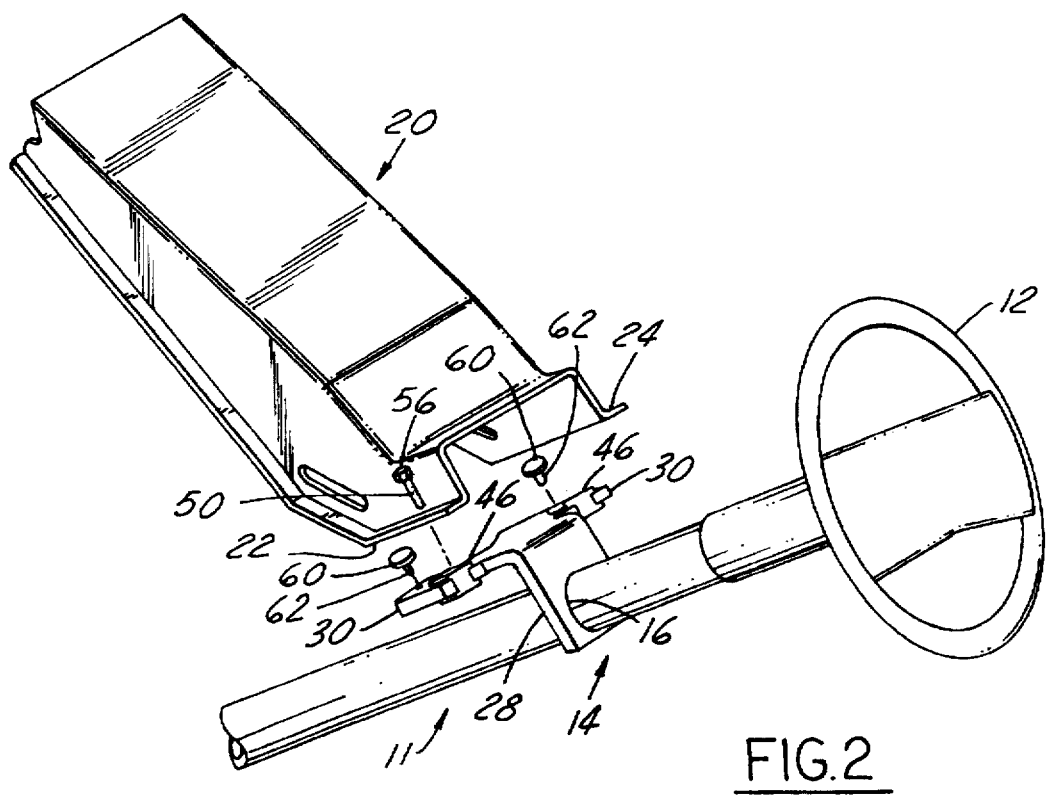
FIG. 2 is an exploded perspective view of the steering column support shown in FIG. 1.

Referring now more particularly to the drawings, and especially to FIGS. 1–6 thereof, there is shown an elongated steering column 11 of an automotive vehicle. The steering column extends upwardly and rearwardly and has a steering wheel 12 at the upper end.

A mounting bracket 14 has an opening 16 through which the steering column extends. The bracket 14 is secured to the steering column by any suitable means.

Support structure 20 for the steering column is rigidly secured to the frame of the vehicle. The support structure 20 is channel-shaped and extends downwardly and rearwardly toward the bracket 14 on the steering column 11. The support structure 20 has laterally spaced parallel flanges 22 and 24 at the lower end.

The bracket 14 has a flat plate 26 with a central extension which is turned down at a right angle to provide a mounting portion 28. The hole 16 through which the steering column extends is formed in the mounting portion 28. The flat plate 26 of the bracket has flanges 30 extending beyond the opposite sides of the steering column 11. The flanges 30 occupy a common plane which is parallel to the central axis of the steering column. The flanges 30 are parallel to and extend beneath the flanges 22 and 24 of the support structure.

The rear edge portions 31 of flanges 30 are notched to provide recesses 32 on opposite sides of the steering column. These recesses have laterally spaced opposite side edges 33 which extend parallel to one another and to the longitudinal axis of the steering column.

Identical fastener assemblies 44 are provided to secure the bracket flanges 30 to the flanges 22 and 24 of the support structure 20. Each fastener assembly has a disc-like, rectangular spacer 46 with grooves 48 in opposite side edges slidably receiving the opposite edges 33 of the recesses 32. The spacers 46 are thick enough to extend above the top surfaces of the flanges 30 to maintain a spaced relationship between the flanges 30 and the flanges 22,24. Each fastener assembly also has a bolt 50 and a nut 52. The bolt extends through registering holes 53 in the flanges 22,24 and holes 54 in the spacers 46 with the heads 56 of the bolts engaging the tops of the supporting flanges 22 and 24 and the nuts threaded on the lower ends of the bolts. The nuts when tightened compress the spacers against flanges 22,24.

The spacers are preferably formed of a resinous plastic material, such as Nylon, and are effective in reducing the transfer of vehicle vibration to the steering column 11. The sliding engagement between the spacers 46 and the flanges 30 of the mounting bracket allows the steering column to collapse in the event of a head-on collision without any significant drag from the fastener assemblies which remain fixed relative to the vehicle support structure.

The fastener assemblies 44 are provided in laterally spaced relation along the rear edge portions of the flanges 30. To augment vibration dampening, isolator pads 60 are provided near the front edges of the flanges 30. The insulator pads are spaced from the spacers 46 and laterally spaced from each other. The isolator pads 60 are shown as being in the form of flat circular discs having integral pins 62 extending axially from the center of one side of the discs. The pins 62 are frictionally held in holes 64 in the flanges 30. The isolator pads are preferably formed of a resinous plastic material such as Nylon. These pads fill the space between the bracket flanges 30 and the support flanges 22,24 and are actually preferably clamped between such flanges under pressure so that they are in a compressed condition at all times. The isolator pads 60 thus significantly increase the effectiveness of the assembly to reduce if not eliminate vibration of the steering column 11. The isolator pads also prevent any tendency of the mounting bracket, and hence the steering column, from tilting or rocking about a transverse, horizontal axis through the fastener assemblies. This is important not only in reducing vibration and stabilizing the steering column, but also to insure a direct longitudinal collapse of the steering column without tilting in the event of a collision.

FIGS. 7–10 illustrate a modification of the invention in which all elements of the construction shown are the same with the exception of the isolator pads. In this form of the invention, the isolator pads, here designated 70, are in the form of flat circular discs similar to the isolator pads previously described, but instead of a single pin projecting from one side, each pad 70 has aligned, integral pins 72 extending axially in opposite directions from the center of the pad. Each pin 72 has an enlarged head 74 on its outer end which is cone-shaped and provides a shoulder 75 at the base. One pin 72 of each pad is adapted to extend through a hole 64 in a flange 30 of the mounting bracket, and the other pin is adapted to extend through a hole 76 in one of the flanges 22,24 of the support structure. The heads of the pins extend completely through the holes in the flanges so that the shoulders 75 have a locking engagement with the outer surfaces of the flanges. The tapered form of the heads make the pins easier to install, but the shoulder formed by the special head construction make the pins very difficult to withdraw.

The pads 70 have increased vibration dampening characteristics, because the pads resist movement of the flanges 22,24 and 30 toward one another while the heads 74 of the pins 72 resist movement of the flanges away from one another. Thus, the isolator pads shown in FIGS. 7–10 dampen vibration in both directions and more effectively reduce the transmission of vibratory forces to the steering column.

What is claimed is:

1. An apparatus for supporting a steering column of an automotive vehicle having a vehicle frame, and said apparatus dampens vibration of the steering column when the automotive vehicle is in motion and also permitting axial collapse of the steering column in a collision, said apparatus comprising a support structure secured to the vehicle frame and having laterally spaced, first and second support flanges, a bracket secured to the steering column and having laterally spaced, first and second bracket flanges at opposite sides of said steering column and respectively opposed to and spaced from said support flanges, each of said bracket flanges having a rear edge and a front edge, said first bracket flange having a first recess extending through the rear edge thereof provided with spaced apart side edges which extend parallel to one another and to the steering column, said second bracket flange having a second recess extending through the rear edge thereof provided with spaced apart side edges which extend parallel to one another and to the steering column, fastener assemblies connecting said first bracket flange to said first support flange and said second bracket flange to said second support flange for movement of said bracket flanges relative to said support flanges in a direction to permit longitudinal collapse of the steering column in a collision, said fastener assemblies comprising a first spacer and a second spacer, each of said spacers being made of a resinous, plastic material, means securing said first spacer to said first support flange and said second spacer to said second support flange, said first spacer having side edges provided with grooves slidably receiving the side edges of said first recess, said second spacer having side edges provided with grooves slidably receiving the side edges of said second recess, a first isolator pad of resinous, plastic material between and in surface-to-surface contact with said first flanges, a second isolator pad of resinous, plastic material between and in surface-to-surface contact with said second flanges, and means securing said isolator pads to said respective bracket flanges in positions between said spacers and the front edges of said bracket flanges, said spacers serving to dampen steering column vibration and said isolator pads serving to dampen steering column vibration and rocking of said steering column about a transverse axis through said spacers.

2. The apparatus as defined in claim 1, wherein said first support flange and said first bracket flange have aligned first holes, said second support flange and said second bracket flange have aligned second holes, said first isolator pad has integral pins projecting through said aligned first holes in said first support flange and said first bracket flange, said second isolator pad has integral pins projecting through said aligned second holes in said second support flange and said second bracket flange, said pins having outer ends formed with enlarged heads providing shoulders engaged over said support and bracket flanges to lock said pins in said holes whereby said isolator pads dampen vibration of said support and bracket flanges in directions toward and away from each other, said heads being cone-shaped to facilitate installation in said holes.

* * * * *